United States Patent [19]

Wakahara et al.

[11] Patent Number: 5,085,105
[45] Date of Patent: Feb. 4, 1992

[54] DOWNSHIFT CONTROL FOR AUTOMATIC TRANSMISSION

[75] Inventors: Tatsuo Wakahara, Kawasaki; Kazuyoshi Iwanaga; Shigeru Ishii, both of Atsugi, all of Japan

[73] Assignee: Nissan Motor Co., Ltd., Yokohama, Japan

[21] Appl. No.: 485,889

[22] Filed: Feb. 28, 1990

[30] Foreign Application Priority Data

Feb. 28, 1989 [JP] Japan .................................. 1-48757

[51] Int. Cl.⁵ .............................................. B60K 41/06
[52] U.S. Cl. ......................................... 74/866; 74/867
[58] Field of Search .............. 74/866, 867; 364/424.1; 192/0.033, 0.076

[56] References Cited

U.S. PATENT DOCUMENTS

| | | | |
|---|---|---|---|
| 4,200,175 | 4/1980 | Dick | 192/0.033 |
| 4,367,528 | 1/1983 | Kawamoto et al. | 364/424.1 X |
| 4,680,992 | 7/1987 | Hayasaki et al. | 74/869 |
| 4,697,479 | 10/1987 | Hayakawa et al. | 74/867 |
| 4,730,519 | 3/1988 | Nakamura et al. | 74/866 |
| 4,730,521 | 3/1988 | Hayasaki et al. | 74/867 |
| 4,807,496 | 2/1989 | Hayasaki et al. | 74/866 |
| 4,890,515 | 1/1990 | Taniguchi et al. | 74/866 |

FOREIGN PATENT DOCUMENTS

| | | |
|---|---|---|
| 62-62047 | 3/1987 | Japan . |
| 62-88856 | 4/1987 | Japan . |
| WO85/04225 | 9/1985 | World Int. Prop. O. ........ 192/0.076 |
| WO89/03318 | 4/1989 | World Int. Prop. O. ........ 192/0.076 |

OTHER PUBLICATIONS

Service Manual for Automatic Transmission of the RE4R01A Type (A261C07), Nissan Motor Company Limited, Mar. 1987.

Primary Examiner—Allan D. Herrmann
Assistant Examiner—Benjamin Levi
Attorney, Agent, or Firm—Foley & Lardner

[57] ABSTRACT

A downshift control in an automatic transmission is disclosed wherein magnitude of servo activating hydraulic fluid pressure is temporarily decreased as a function of vehicle speed when the automatic transmission effects a downshift from a current gear ratio to a new gear ratio. Owing to this arrangement, a fluid operated frictional device associated with the current gear ratio is released quickly without any lag to allow quick increase in engine speed during the downshift with the throttle fully opened at a high vehicle speed, i.e., a power-on downshift at high vehicle speed.

4 Claims, 9 Drawing Sheets

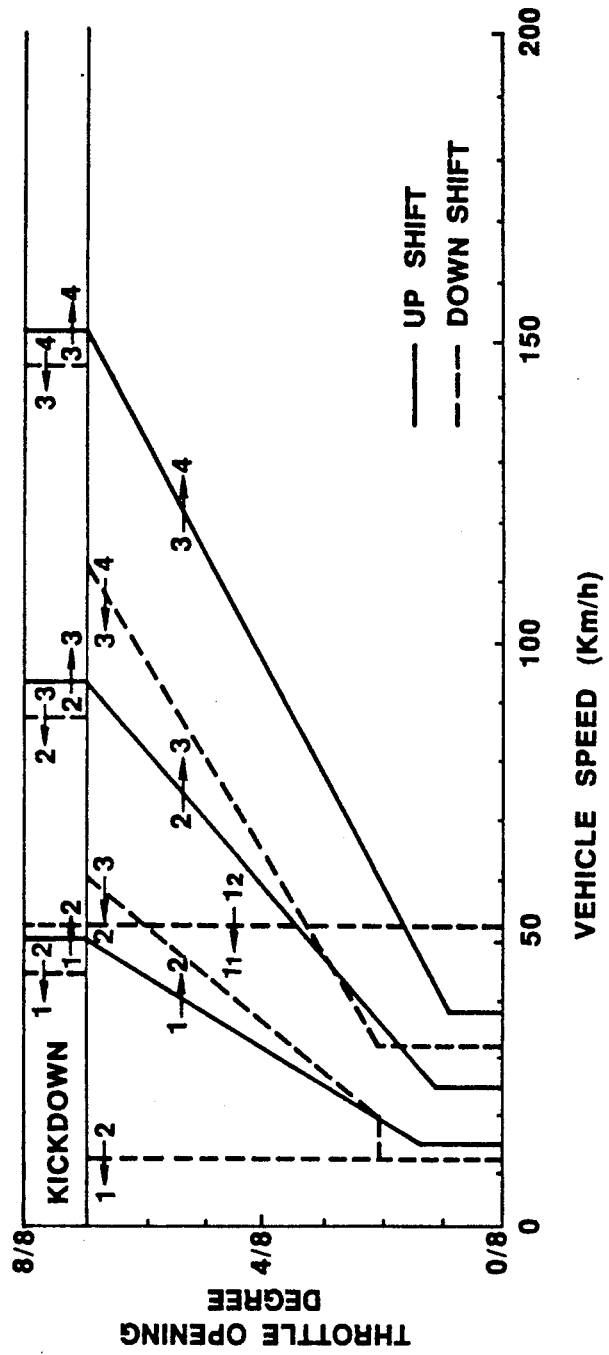

DOWNSHIFT CONTROL FOR AUTOMATIC TRANSMISSION

BACKGROUND OF THE INVENTION

The present invention relates to a downshift control in a motor vehicle with an automatic transmission.

U.S. Pat. No. 4,730,521 discloses an automatic transmission for a motor vehicle. This known automatic transmission comprises a plurality of planetary gear sets and it is shiftable from a current gear ratio to a new gear ratio by changing relationship in connection among constituent elements of the plurality of planetary gear sets by engaging or releasing at least one of a plurality of frictional devices, i.e., brakes and clutches.

In the known automatic transmission, a line pressure is used as a servo activating hydraulic fluid pressure for activating the frictional devices. The line pressure is variable in response to engine load (i.e., throttle opening degree) such that the line pressure is increased during operation with high engine load to prevent occurrence of a slip in the frictional devices.

Upon making a shift from a current gear ratio to a new gear ration, a fluid operated frictional device associated with the current gear ratio which is engaged with the line pressure is released by discharging hydraulic fluid from the frictional device, and subsequently hydraulic fluid is supplied to another fluid operated frictional device associated with the new gear ratio.

JP 62-88856 A teaches that magnitude of a line pressure is varied upon making a shift.

Referring to FIG. 9, the known automatic transmission disclosed in U.S. Pat. No. 4,730,521 is further described. FIG. 9 is a timing diagram during a 3-2 downshift when hydraulic fluid is discharged from a fluid operated frictional device, i.e., a high clutch, associated with the third gear ratio immediately after a command for the 3-2 downshift (the instant $t_0$ in FIG. 9) and subsequently hydraulic fluid is released from a release side of another frictional device, i.e., a second brake, associated with the second gear ratio. In this timing diagram, servo activating hydraulic fluid pressure within the high clutch decreases along a curve L, and engine revolution speed increases along a curve E. The hydraulic fluid pressure within the high clutch stays as high as the level of line pressure as illustrated by a broken line $P_L$ for the duration of time $t_1$ after the instant $t_0$. Thus, the high clutch remains engaged to keep applying substantial load on the engine, so that an increase in engine revolution speed immediately after the instant $t_0$ is slow. In other words, the increase in engine revolution speed is slow when the duration of time $t_1$ is long.

FIG. 10 shows engine revolution speed vs., vehicle speed characteristics with the first, second and third gear ratios as parameters of the known automatic transmission in question. As readily understood from FIG. 10, an increase in engine revolution speed during 3—2 downshift at a vehicle speed $V_1$ is represented by a double headed arrow $E_1$, and an increase in engine revolution speed during 3-2 downshift at a vehicle speed $V_2$ is represented by a double headed arrow $E_2$. This indicates that an increase in engine revolution speed during 3-2 downshift becomes great as the vehicle speed increases.

Thus, it is required to induce a quick rise in engine revolution speed at high vehicle speed. However, the presence of residual fluid pressure during the duration of time $t_1$ causes the rise in engine revolution speed to occur at a delayed instant during 3-2 downshift at a high vehicle speed. This results in an increased duration of time required from the occurrence of the command (at the instant $t_1$) to the completion of the downshift, i.e., at the instant when the engine revolution speed reaches a new target value for the second gear ratio, inducing a shift lag.

In order to shorten the duration of time $t_1$, it has been proposed in JP 62-88856 A that the line pressure is decreased temporarily during downshift. This proposal is effective for downshift at a high vehicle speed. However, if this proposal is put into effect during the same downshift at a low vehicle speed, engine racing is induced since as shown in FIG. 10, the increase in engine revolution speed required at low vehicle speed is not great.

An object of the present invention is to improve a downshift control such that a downshift at a low vehicle speed is not accompanied with engine racing, while the same downshift at a high vehicle speed is made without any shift lag.

SUMMARY OF THE INVENTION

The present invention is embodied in a motor vehicle having an engine and an automatic transmission drivingly connected to the engine, the automatic transmission effecting a downshift from a current gear ratio to a new gear ratio by discharging hydraulic fluid from a predetermined fluid operated frictional device associated with the current gear ratio to release the predetermined fluid operated fictional device after a command for the downshift has occurred. According to one aspect of the present invention, there are provided;

means for generating a servo activating hydraulic fluid pressure, said servo activating hydraulic fluid pressure being supplied to the first fluid operated frictional device when the current gear ratio is established;

means for detecting a vehicle speed of the motor vehicle and generating a vehicle speed indicative signal indicative of said vehicle speed detected; and means for varying magnitude of said servo activating hydraulic fluid pressure in response to said vehicle speed indicative signal when the automatic transmission effects the downshift.

Another aspect of the present invention is embodied in a motor vehicle having an engine and an automatic transmission drivingly connected to the engine, the engine having a throttle which opens in degrees, the automatic transmission effecting a downshift from a current gear ratio to a new gear ratio by discharging hydraulic fluid from a predetermined fluid operated frictional device associated with the current gear ratio to release the predetermined fluid operated fictional device after a command for the downshift has occurred. According to this aspect, there are provided:

means for detecting a throttle opening degree of the throttle of the engine and generating a throttle opening degree indicative signal indicative of the throttle opening degree detected;

means for generating a servo activating hydraulic fluid pressure which varies in response to said throttle opening degree indicative signal such that magnitude of said servo activating hydraulic fluid pressure increases as the throttle opening degree increases, said servo activating hydraulic fluid pressure being supplied to the first fluid operated frictional device when the current gear ratio is established;

means for detecting a vehicle speed of the motor vehicle and generating a vehicle speed indicative signal indicative of said vehicle speed detected; and means for urging said servo activating hydraulic fluid pressure generating means to temporarily decrease the magnitude of said servo activating hydraulic fluid pressure in response to said vehicle speed indicative signal when the automatic transmission effects the downshift. According to still another aspect of the present invention, there is provided a downshift control method in a motor vehicle having an engine and an automatic transmission drivingly connected to the engine, the automatic transmission effecting a downshift from a current gear ratio to a new gear ratio by discharging hydraulic fluid from a predetermined fluid operated frictional device associated with the current gear ratio to release the predetermined fluid operated fictional device after a command for the downshift has occurred. The downshift control method comprising the steps of;

generating a servo activating hydraulic fluid pressure, said servo activating hydraulic fluid pressure being supplied to the first fluid operated frictional device when the current gear ratio is established;

detecting a vehicle speed of the motor vehicle and generating a vehicle speed indicative signal indicative of said vehicle speed detected; and varying magnitude of said servo activating hydraulic fluid pressure in response to said vehicle speed indicative signal when the automatic transmission effects the downshift.

According to still further aspect of the present invention, there is provided a downshift control method in a motor vehicle having an engine and an automatic transmission drivingly connected to the engine, the engine having a throttle which opens to degrees, the automatic transmission effecting a downshift from a current gear ratio to a new gear ratio by discharging hydraulic fluid from a predetermined fluid operated frictional device associated with the current gear ratio to release the predetermined fluid operated frictional device after a command for the downshift has occurred. The downshift control method comprising the steps of:

detecting a throttle opening degree of the throttle of the engine and generating a throttle opening degree indicative signal indicative of the throttle opening degree detected;

generating a servo activating hydraulic fluid pressure which varies in response to said throttle opening degree indicative signal such that magnitude of said servo activating hydraulic fluid pressure increases as the throttle opening degree increases, said servo activating hydraulic fluid pressure being supplied to the first fluid operated frictional device when the current gear ratio is established;

detecting a vehicle speed of the motor vehicle and generating a vehicle speed detected; and temporarily decreasing the magnitude of said servo activating hydraulic fluid pressure in response to said vehicle speed indicative signal when the automatic transmission effects the downshift.

BRIEF DESCRIPTION OF THE DRAWINGS

FIG. 4 is a shift point mapping;

DETAILED DESCRIPTION OF THE INVENTION

Figure 1:
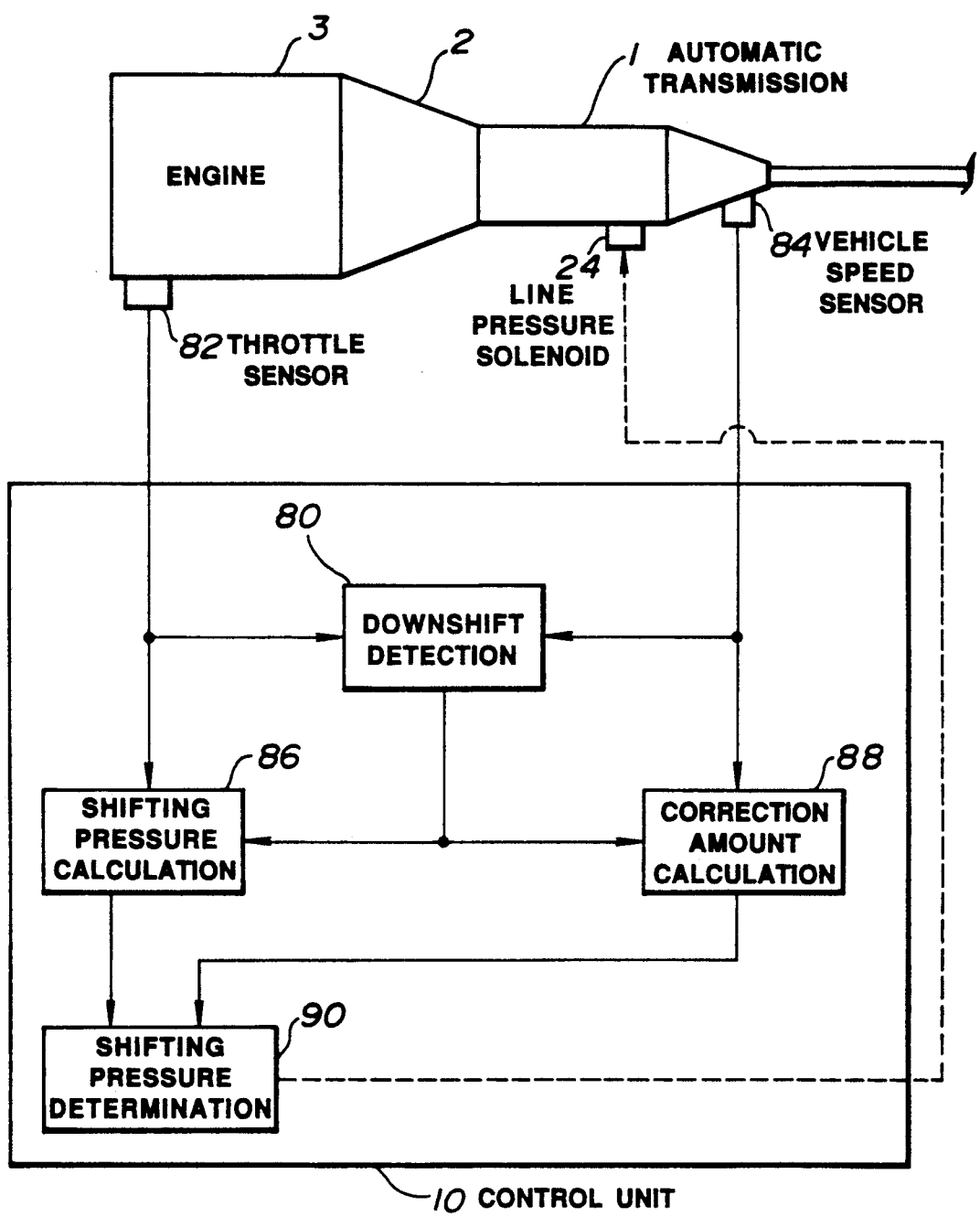
FIG. 1 is a block diagram illustrating a motor vehicle with a downshift control according to the present invention.

Referring to FIG. 1, a motor vehicle has an automatic transmission 1 drivingly connected via a torque converter 2 to an internal combustion engine 3, and a control unit 10. The automatic transmission 1 includes a hydraulic control system where a line pressure is adjustable by a line pressure solenoid 24. Also shown are a throttle sensor 82 which detects a throttle opening degree of a throttle of the engine and generates a throttle opening degree indicative signal indicative of the throttle opening degree detected, and a vehicle speed sensor 84 which detects a vehicle speed, i.e., a revolution speed of the transmission output shaft, and generates a vehicle speed indicative signal indicative of the revolution speed of the transmission output shaft detected. These sensor output signals are supplied to the control unit 10, and an output signal of the control unit 10 is supplied to the line pressure solenoid 24.

Figure 2:
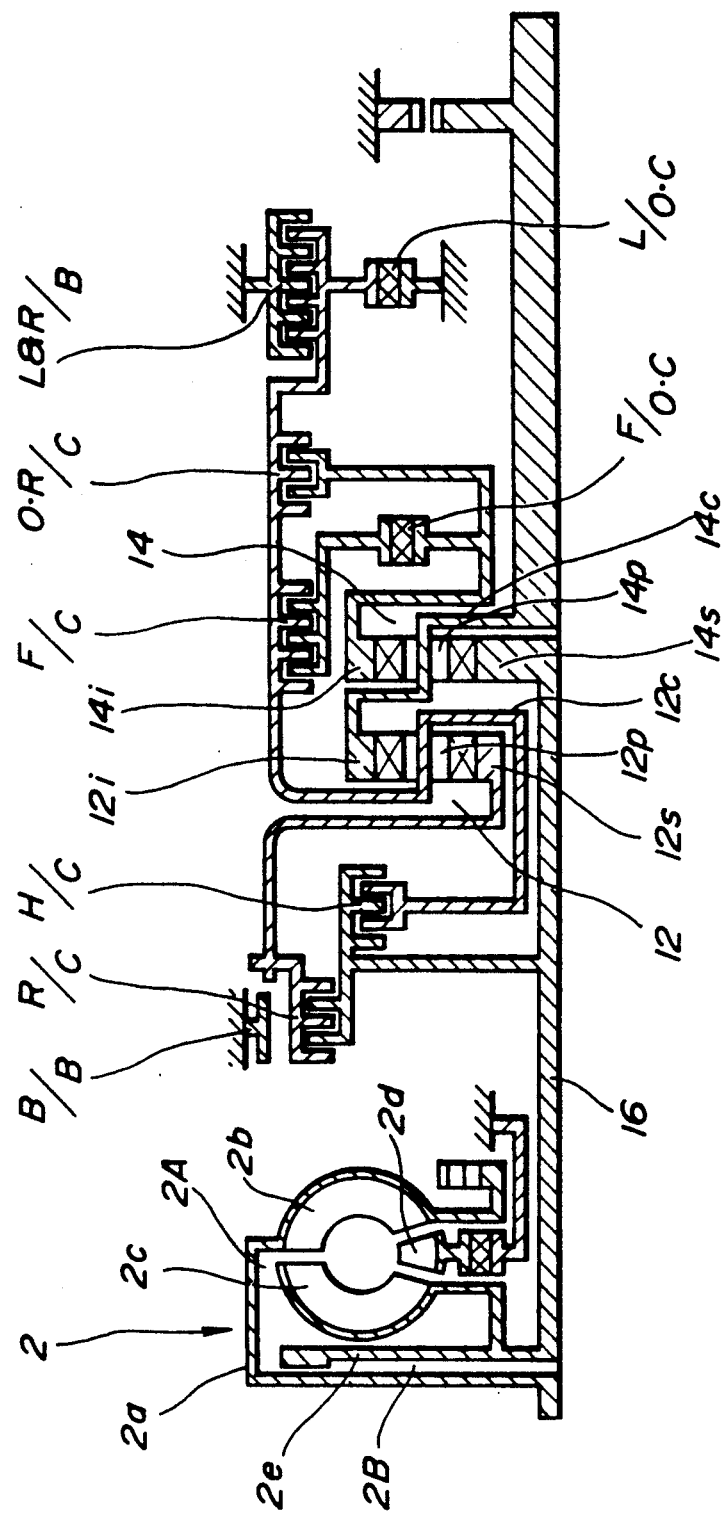
FIG. 2 is a schematic view shown a power train of an automatic transmission in the motor vehicle.

Referring to FIG. 2, the power train comprises a front planetary gear set 12 and a rear planetary gear set 14 arranged in tandem. The front planetary gear set 12 includes a front sun gear 12s, at least one front pinion 12p, a front ring gear 12a, and a front pinion carrier 12c rotatably supporting the front pinion 12p. The front pinion 12p is in mesh with the front sun gear 12s and the front ring gear 12i. The rear planetary gear set 14 includes a rear sun gear 14s, at least one rear pinion 14p, a rear ring gear 14i, and a rear pinion carrier 14c rotatably supporting the rear pinion 14p. The rear pinion 14p is in mesh with the rear sun gear 14s and the rear ring gear 14i.

The power train also comprises various kinds of fluid operated frictional devices. The frictional devices include a reverse clutch R/C which when engaged connects a transmission input shaft 16 to the front sun gear 12e, a high clutch H/C which when engaged connects the input shaft 16 to the front carrier 12c, a forward clutch F/C which when engaged connects front pinion carrier 12c to the rear ring gear 14i, a brake band B/B which when engaged holds the front sun gear 12s stationary relative to the transmission housing, and a low & reverse brake L&R/B which when engaged holds the front pinion carrier 12c stationary relative to the transmission housing.

Operatively disposed between the forward clutch F/C and the rear ring gear 14i is a forward one-way clutch F/O C. Operatively disposed between the front pinion carrier 12c and the transmission housing is a low one-way clutch L/O C. Operatively disposed between the front pinion carrier 12c and the rear ring gear 14i is an overrunning clutch O R/C arranged in parallel with the forward one-way clutch F/O C.

Figure 3A:
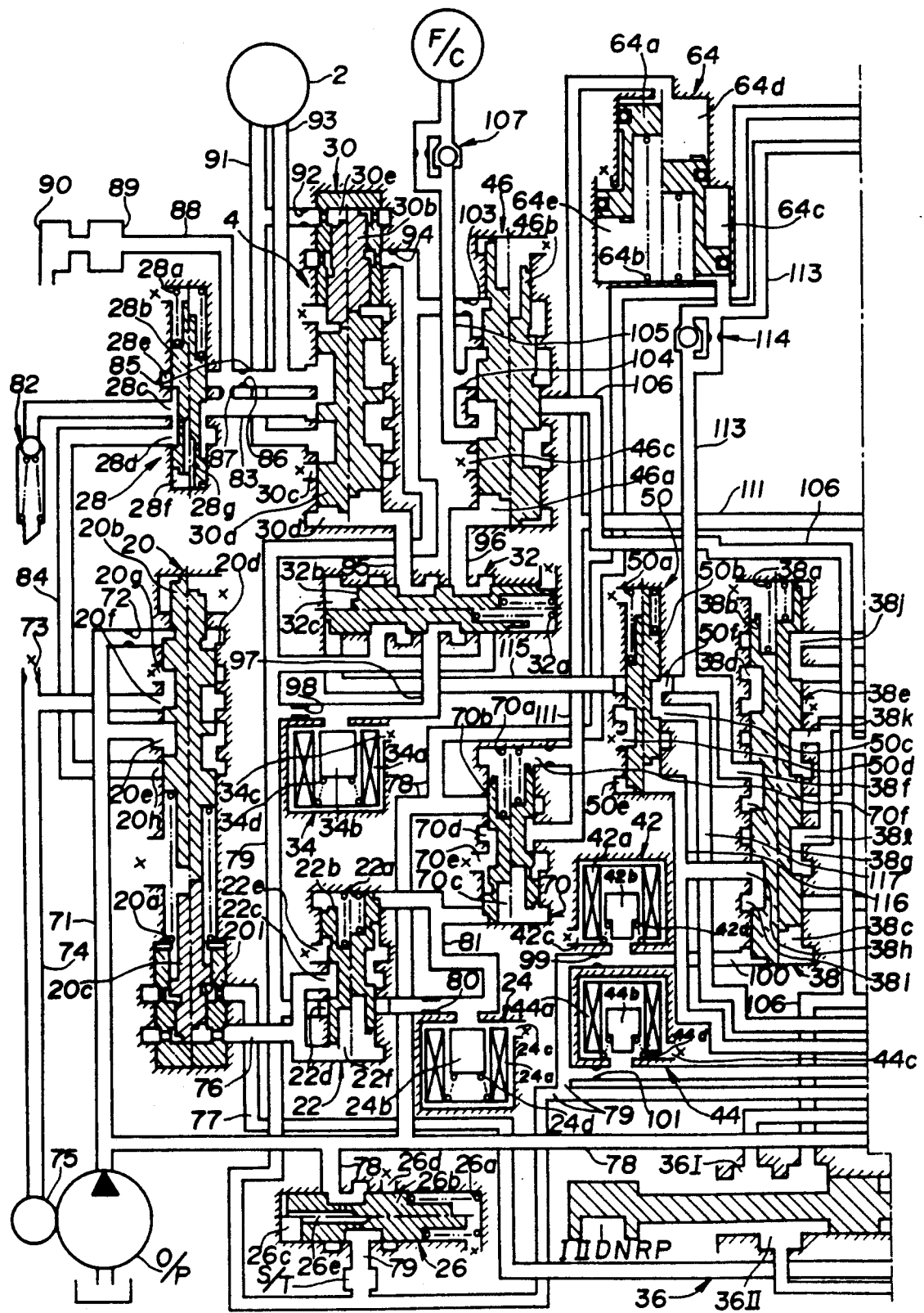
FIGS. 3A and 3B, when combined side by side, illustrate a hydraulic control system for the automatic transmission.
Figure 3B:
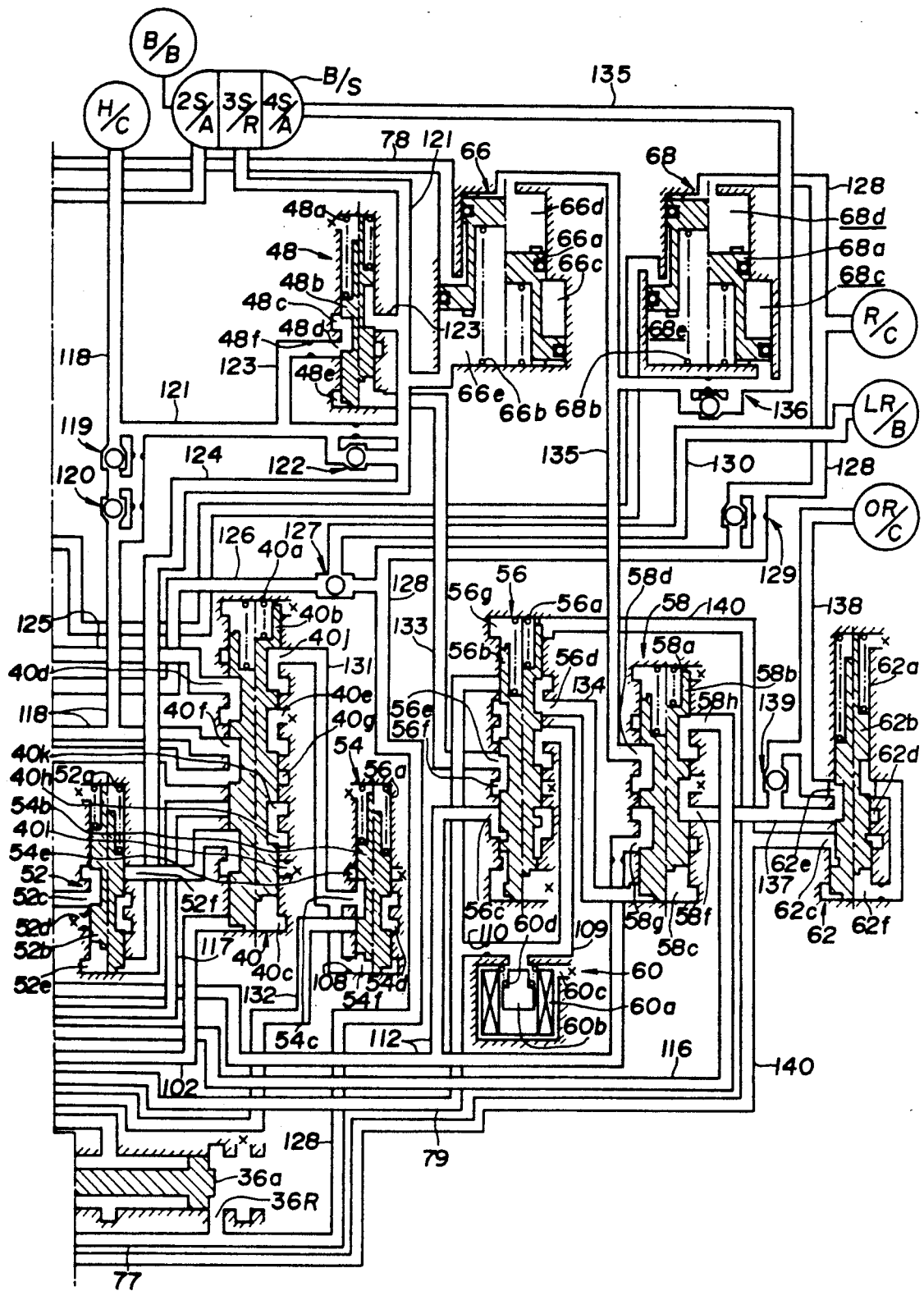

Four forward gear ratios and one reverse gear ratio are established when appropriate one or ones of the fluid operated frictional device are activated by a line pressure generated in the hydraulic control system which is illustrated in FIGS. 3A and 3B. The following TABLE 1 illustrates which one or ones of the frictional devices are to be engaged to establish a desired one of the various gear ratios.

TABLE 1

|      | R/C | H/C | F/C | B/B | L&R/B |
|------|-----|-----|-----|-----|-------|
| Rev. | O   |     |     |     | O     |
| 1st. |     |     | O   |     |       |
| 2nd. |     |     | O   | O   |       |
| 3rd. |     | O   | O   |     |       |
| 4th. |     | O   |     | O   |       |

In the TABLE 1, the character "O" designates engagement of the particular frictional device.

The forward one-way clutch F/O C is free during forward rotation of the rear ring gear 14i with respect to the front pinion carrier 12c, but it is locked during the reverse rotation of the rear ring gear 14i. The low one-way clutch L/O C is free during forward rotation of the front pinion carrier 12c, but it is locked during the reverse rotation of the front pinion carrier 12c.

The overrunning clutch O R/C is engaged to render the forward one-way clutch F/O C inoperable, establishing engine brake running state.

FIGS. 3A and 3B illustrate the hydraulic control system.

The hydraulic control system comprises the following elements:
A pressure regulator valve 20;
 A pressure modifier valve 22;
 A line pressure solenoid 24;
 A pilot valve 26;
 A torque converter regulator valve 28;
 A lock-up control valve 30;
A shuttle valve 32;
A lock-up solenoid valve 34;
A manual valve 36;
 A first shift valve 38;
A second shift valve 40;
A first shift solenoid 42;
A second shift solenoid 44;
A forward clutch control valve 46;
A 3-2 timing valve 48;
A 4-2 relay valve 50;
A 4-2 sequence valve 52;
A I range pressure reduction valve 54;
A shuttle valve 56;
An overrunning clutch control valve 58;
A third shaft solenoid 60;
An overrunning clutch pressure reduction valve 62;

A second gear ratio servo apply side pressure accumulator 64;
A third gear ratio servo release side pressure accumulator 66;
A fourth gear ratio servo apply side pressure accumulator 68;
An accumulator control valve 70.

the above-mentioned elements are operatively connected, as illustrated in FIGS. 3A and 3B, to the reverse clutch R/C, high clutch H/C, forward clutch F/C, brake band B/B, low and reverse brake L&R/B, overrunning clutch O R/C and the oil pump O/P.

The automatic transmission thus far described in connection with FIGS. 2, 3A and 3B is well known and described in a publication entitled "SERVICE MANUAL FOR AUTOMATIC TRANSMISSION OF THE RE4R01A TYPE" (A261C07) published in Japan in March 1987 by NISSAN MOTOR COMPANY, LIMITED. In order to fully understood the operation of the automatic transmission, reference should be made to U.S. Pat. No. 4,680,992 issued to Hayasaki et al. on July 21, 1987, which has been herein incorporated by reference in its entirety (see shift solenoids 42, 44, and line pressure solenoid 24 in FIGS. 1A, 1B and 1C). Reference should also be made to U.S. Pat. No. 4,730,521 issued to Hayasaki et al. on Mar. 15, 1988, which has been herein incorporated by reference in its entirety.

Referring to FIG. 3B, the band brake B/B is activated by a band servo B/S. The band servo B/S comprises a second gear ratio servo apply side pressure chamber 2S/A, a third gear ratio servo release side pressure chamber 3S/R, and a fourth gear ratio servo apply side pressure chamber 4S/A. When hydraulic fluid pressure is supplied to the second gear ratio servo apply side pressure chamber 2S/A only, the band brake B/B is engaged. When, under this condition, the hydraulic fluid pressure is supplied to the third gear ratio servo release side pressure chamber 3S/R, the band brake B/B is released. Subsequently, when the hydraulic fluid pressure is supplied to the fourth gear ratio servo apply side pressure chamber 4S/A, the band brake B/B is engaged again.

Referring to FIGS. 3A and 3B, the first and second shift valves 38 and 40 are shiftable under the control of the first and second shift solenoids 42 and 44. When both of the first and second shift solenoids 42 and 44 are energized to take the "ON" position, a pilot pressure is supplied to the first and second shift valves 38 and 40, during the spools of the first and second shift valve 38 and 40 to take upper positions as illustrated by the righthand halves thereof, respectively. When both of the first and second shift solenoids 42 and 44 are deenergized to take the "OFF" position, the hydraulic fluid is discharged from the first and second shift valve 38 and 40, allowing the spools of the shift valves 38 and 40 to take lower positions as illustrated by the lefthand halves thereof, respectively.

The first and second shift solenois 42 and 44 are energized to take "ON" position or deenergized to take "OFF" position to establish four gear ratios in the automatic transmission, in accordance with the schedule as illustrated in the following TABLE 2.

TABLE 2

|      | Sol. 42 | Sol. 44 |
|------|---------|---------|
| 1st. | ON      | OFF     |
| 2nd. | OFF     | ON      |

TABLE 2-continued

|      | Sol. 42 | Sol. 44 |
|------|---------|---------|
| 3rd. | OFF     | OFF     |
| 4th. | ON      | OFF     |

The first and second shift solenoids 42 and 44, and thus the first and second shift valves 38 and 40 are controlled in accordance with shift point mapping shown in FIG. 4.

In the hydraulic control system shown in FIGS. 3A and 3B, pressurized hydraulic fluid discharged by the oil pump O/P is supplied to the pressure regulator valve 20 where pressure regulation is effected to generate a line pressure. This line pressure is supplied as a servo activating hydraulic pressure to selected one or ones of the above-mentioned frictional devices, i.e., clutches and brakes.

The pressure regulator valve 20 shown in FIG. 3A includes a spool 20b, a plug 20c, and a spring 20a between them. The pressurized hydraulic fluid discharged from the oil pump O/P is supplied to a port 20d to urge the spool 20b downward as viewed in FIG. 3A against the action of the spring 20a, while a modifier pressure is supplied via a modifier pressure fluid line 76 to the pressure regulator valve 20 to act on a lower end of the plug 20c as viewed in FIG. 3A. Due to the modifier pressure, the plug 20c moves toward the spool 20b to assist the action of the spring 20a. Thus, the magnitude of the line pressure (appearing at a port 20e) is a function of the force of the spring 20a. This force of the spring 20a is varied in response to the modifier pressure. Therefore, the line pressure is variable with the modifier pressure.

The modifier pressure is generated by the pressure modifier valve 22 that is controlled by a signal pressure generated under the control of the line pressure solenoid 24.

When it is deenergized, the line pressure solenoid 24 closes fluid communication between a signal pressure line 81 and a drain port 24c, while when it is energized, opens this fluid communication. The signal pressure line 81 is connected via an orifice 80 with a pilot pressure line 79. To vary the signal pressure within the signal pressure line 81, the duty ratio of solenoid current passing through a solenoid 24a of the line pressure solenoid 24 is varied. This signal pressure is supplied to the pressure modifier 22 to act on an upper end (as viewed in FIG. 3A) of a spool 22b of the pressure modifier valve 22.

From the previous description, it is understood that the magnitude of the line pressure varies in response to the magnitude of the modifier pressure that varies in response to the magnitude of the signal pressure. Therefore, the magnitude of the line pressure varies in response to the duty ratio of the solenoid current supplied to the line pressure solenoid 24.

The duty ratio of the solenoid current supplied to the line pressure solenoid 24 is controlled by the control unit 10. The control unit 10 determines a duty ratio as a function of a throttle opening degree detected by the throttle sensor 82 (see FIG. 1) such that the signal pressure varies in response to the throttle opening degree. This means that the line pressure varies in response to the throttle opening degree. As the discussion proceeds, it will be understood that the magnitude of the line pressure is temporarily decreased upon detecting a command for shifting.

Turning back to FIG. 1, the operation of the control unit 10 is briefly described. The sensor output signals of the throttle sensor 82 and vehicle speed sensor 84 are supplied to a downshift detection block 80 which generates a command for a downshift after table look-up operation of the shift point mapping shown in FIG. 4 based on the sensor output signals indicative of throttle opening degree and vehicle speed, respectively.

The command for downshift generated by the downshift detection block 80 is supplied to a shifting pressure calculation block 86 and also to a correction amount calculation block 88.

Also supplied to the shifting pressure calculation block 86 is the throttle opening degree indicative signal from the throttle sensor 82. In the block 86, a hydraulic pressure value, i.e., a shifting pressure, suitable for a throttle opening degree upon occurrence of the command for downshift and a kind of the downshift commanded is determined based on a prestored data.

In addition to the command for downshift, the vehicle speed indicative signal from the vehicle speed sensor 84 is supplied to the correction amount calculation block 88. In the block 88, a hydraulic fluid pressure correction value suitable for a vehicle speed upon occurrence of the command for downshift and a kind of the downshift commanded is determined based on a prestored data.

Output signal indicative of the shifting pressure determined in the block 86 and the output signal indicative of the hydraulic fluid pressure correction value determined in the block 88 are supplied to a shifting pressure determination block 90. In the block 90, the shifting pressure determined in the block 86 is corrected by the hydraulic pressure correction amount determined in the block 88 to give a final shifting pressure.

The output signal indicative of the final shifting pressure determined in the block 90 is supplied to the line pressure solenoid 24 to vary the duty ratio of the solenoid current passing through the line pressure solenoid 24. Thus, the line pressure generated by the pressure regulator valve 20 drops in response to the final shifting pressure which is a function of throttle opening degree and vehicle speed.

Figure 5:
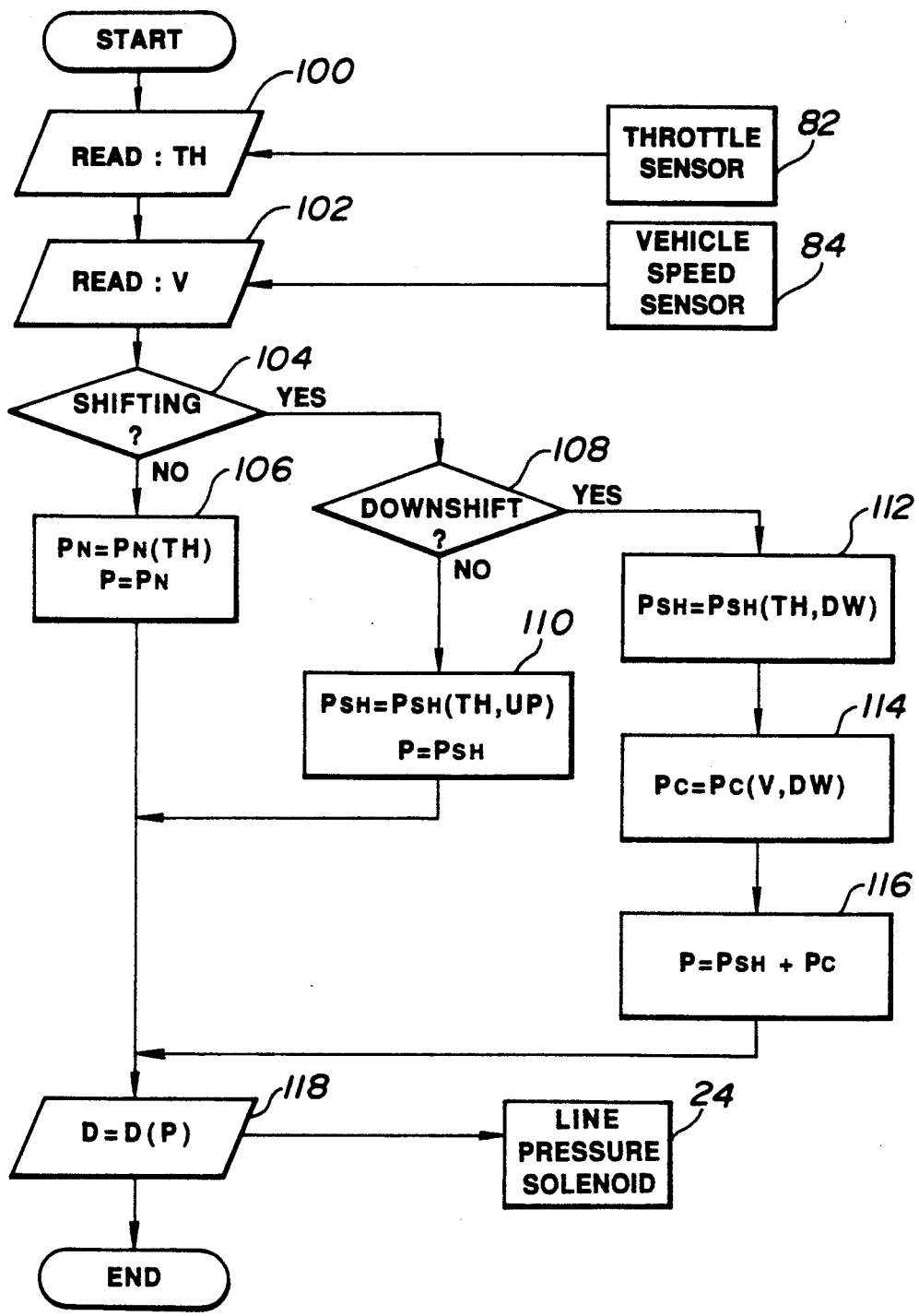
FIG. 5 is a flowchart illustrating the operation of the downshift control.

The operation of the control unit 10 is described in detail along with the flowchart illustrated in FIG. 5.

In FIG. 5, at a step 100, a reading operation of the output signal of the throttle sensor 82 is performed to store a throttle opening degree TH. At the subsequent step 102, a reading operation of the output signal of the vehicle speed sensor 84 is performed to store a vehicle speed V. At a step 104, it is determined whether a shifting is in progress or not. If an answer to the inquiry at the step 104 is NO, i.e., no shifting being in progress, the flow proceeds to a step 106 where a hydraulic fluid pressure $P_N$ for non-shifting operation is determined as a function of throttle opening degree TH stored at step 100, i.e., $P_N = P_N(TH)$. The result is stored at an address P, i.e., $P = P_N$.

If the answer to the inquiry at step 104 is YES, i.e., a shifting being in progress, the flow proceeds to a step 108 where it is determined whether the shifting being in progress is a downshift or not.

If an answer to the inquiry at the stop 108 is NO, i.e., an upshift being in progress, the flow proceeds to a step 110 where a hydraulic fluid pressure value $P_{SH}$ for upshift operation is determined which is suitable for the throttle opening degree TH stored at step 100 and a kind of the upshift UP being in progress, i.e., $P_{SH}=P_{SH}(TH, UP)$. The result is stored at the address P.

If an answer to the inquiry at the step 108 is YES, i.e., a downshift being in progress, the flow proceeds to a step 112 where a hydraulic fluid pressure value $P_{SH}$ for downshift operation is determined which is suitable for the throttle opening degree TH stored at step 100 and a kind of the downshift DW being in progress, i.e., $P_{SH}=P_{SH}(TH, DW)$. At the subsequent step 114, a hydraulic fluid pressure correction value $P_C$ suitable for the vehicle speed V stored at step 102 and the kind of the downshift DW being in progress is determined, i.e., $P_C=P_C(V, DW)$. Then, at the next step 116, the pressure value $P_{SH}$ given at the step 112 is corrected by the correction value $P_C$ given at the step 114 and the result is stored at the address P, i.e., $P=P_{SH}-P_C$. The setting is such that the correction value $P_C$ given at the step 114 increases in accordance with an increase in vehicle speed V.

After the step 106 or 110 or 116, the flow proceeds to a step 118 where the value stored at the address P is converted into a duty ratio D, i.e., $D=D(P)$. Then, the output signal indicative of the duty ratio D determined at the step 118 is supplied to the line pressure solenoid 24.

Figure 6:
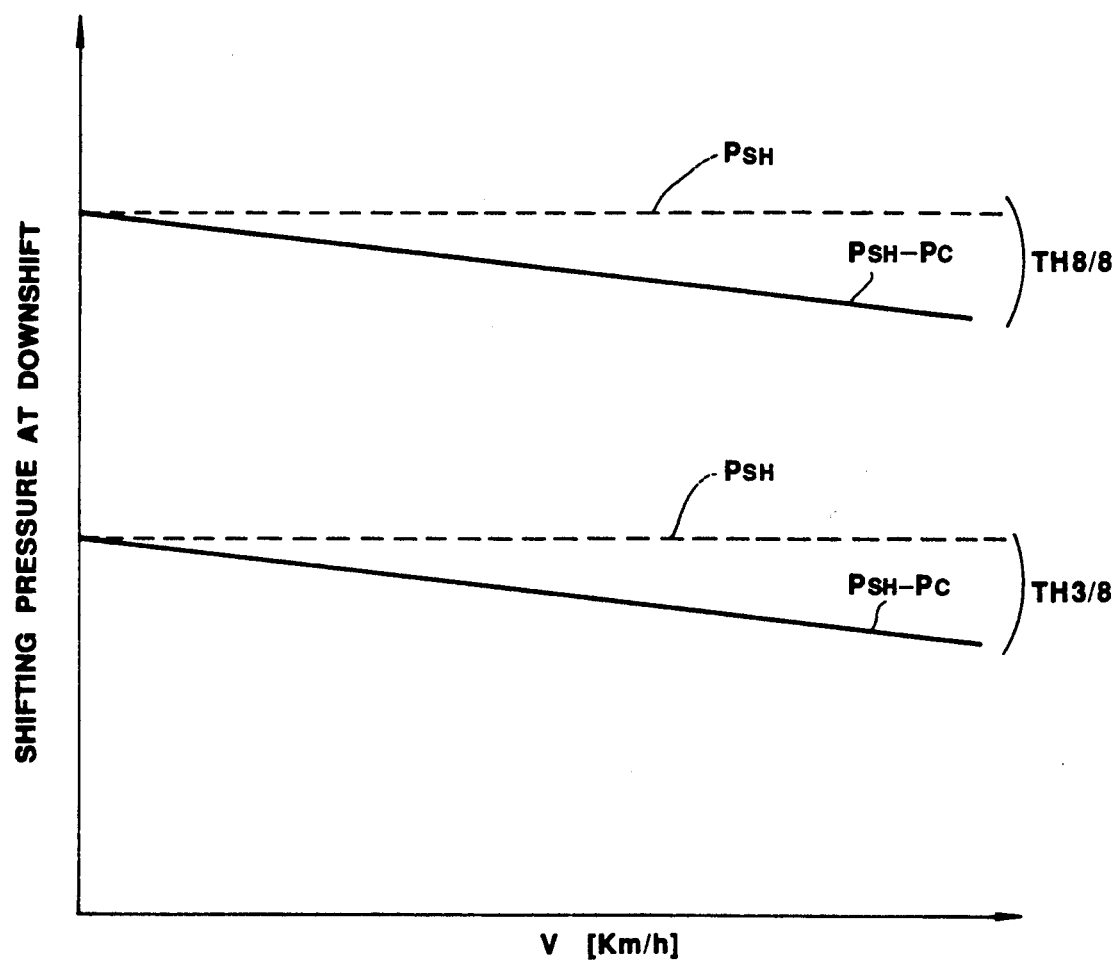
FIG. 6 a graphical representation of variation of pressure values for a 3-2 downshift with different throttle opening degrees.

Referring to FIG. 6, a family of broken straight lines illustrate variation of the pressure value $P_{SH}$ during a 3-2 downshift with the fully opened throttle opening degree TH, i.e., TH8/8, and that with $\frac{5}{8}$ of the fully opened throttle opening degree, i.e., TH$\frac{5}{8}$. as will be seen from the broken lines, the pressure $P_{SH}$ is invariable with the variation of vehicle speed V. In FIG. 6, a family of fully drawn lines illustrate how the final hydraulic pressure given at the step 116, i.e., $P_{SH}=P_C$, varies during 3-2 downshift with the fully opened throttle opening degree and with $\frac{5}{8}$ of the fully opened throttle opening degree. As will be recognized from the family of the fully drawn lines, the hydraulic fluid pressure during downshift decreases as vehicle speed increases.

Figure 7:
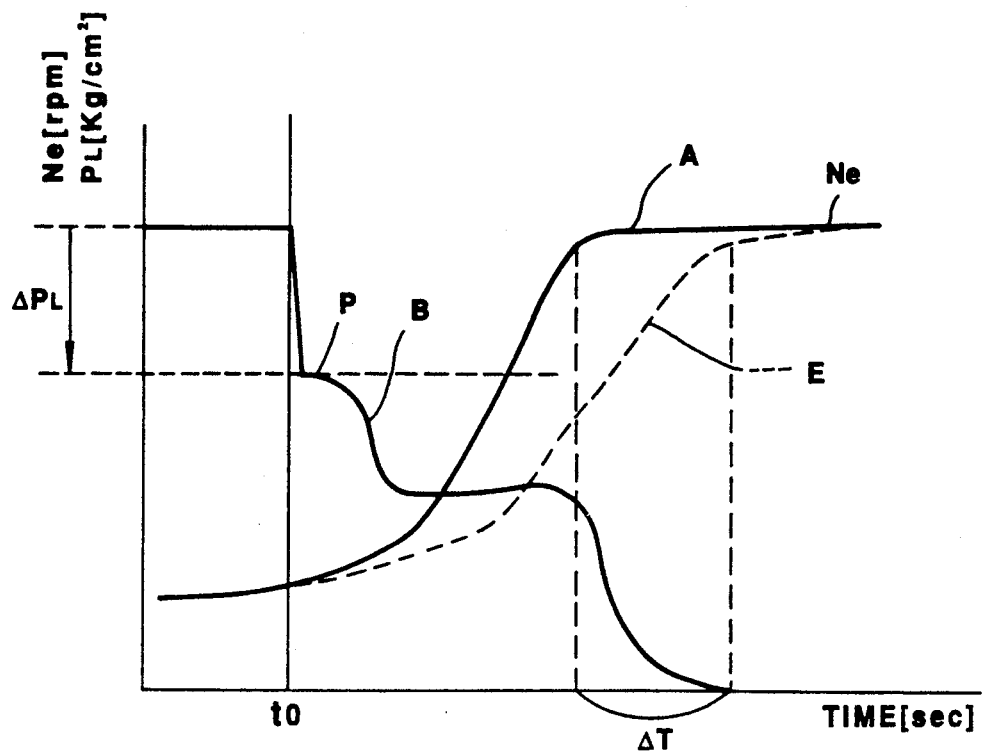
FIG. 7 is a timing diagram during a power-on 3-2 downshift at a high vehicle speed.
Figure 10:
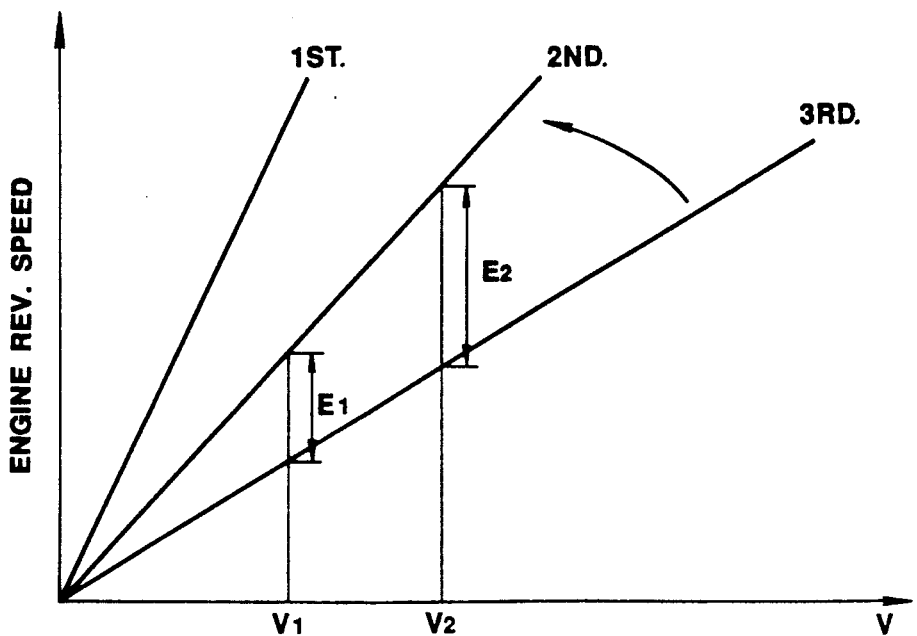
FIG. 10 is engine revolution speed vs., vehicle speed relationship at different gear ratios.
Figure 9:
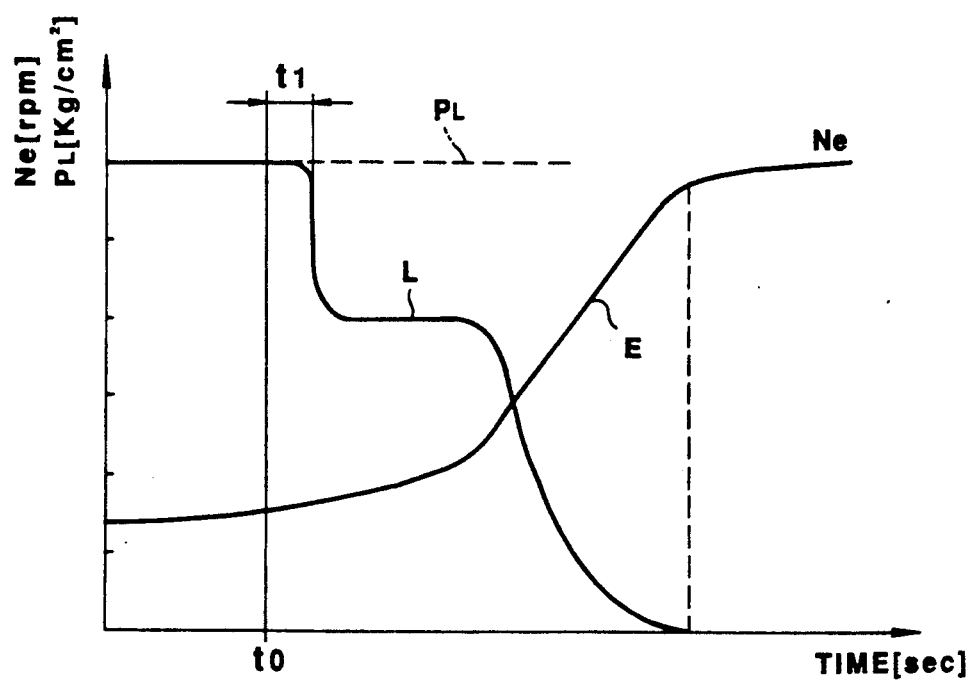
FIG. 9 is a timing diagram, similar to FIG. 7, illustrating a power-on 3-2 downshift at a high vehicle speed according to the prior art discussed before.

FIG. 7 is a timing diagram during a power-on 3-2 downshift at a high vehicle speed. The 3-2 downshift is effected by discharging hydraulic fluid from the high clutch H/C associated with the third gear ratio, and subsequently discharging hydraulic fluid from the release side chamber 3S/R of the band servo B/S for the band brake B/B. In FIG. 7, a fully drawn curve B illustrates the variation of servo activating hydraulic fluid pressure, i.e., clutch pressure, within the high clutch H/C to be released, while another fully drawn curve A illustrates the variation of engine revolution speed Ne. A broken curve E plots the fully drawn curve E shown in FIG. 9. In FIG. 7, a command for power-on 3-2 downshift occurs at the instant $t_0$. Upon occurrence of the command for the downshift (at the instant $t_0$), the servo activating hydraulic fluid pressure is decreased at an amount $\Delta P_L$ (delta $P_L$) to a level P determined at the step 116 (see FIG. 5). Owing to this pressure drop, the hydraulic fluid is discharged quickly from the high clutch H/C as illustrated by the curve B. This causes a quick increase in engine revolution speed as will be readily understood from comparison of the curve A with the broken curve E. As a result, the duration of time required for the downshift is shortened by a period of time $\Delta T$ (delta T). Thus, without any shift lag, the power-on 3-2 downshift at high vehicle speed is effected.

During a power-on 3-2 downshift at a low vehicle speed, the correction amount $P_C$ determined at the step 114 decreases as is seen from FIG. 6. Thus, there is no possibility of occurrence of engine racing during the downshift.

Figure 8:
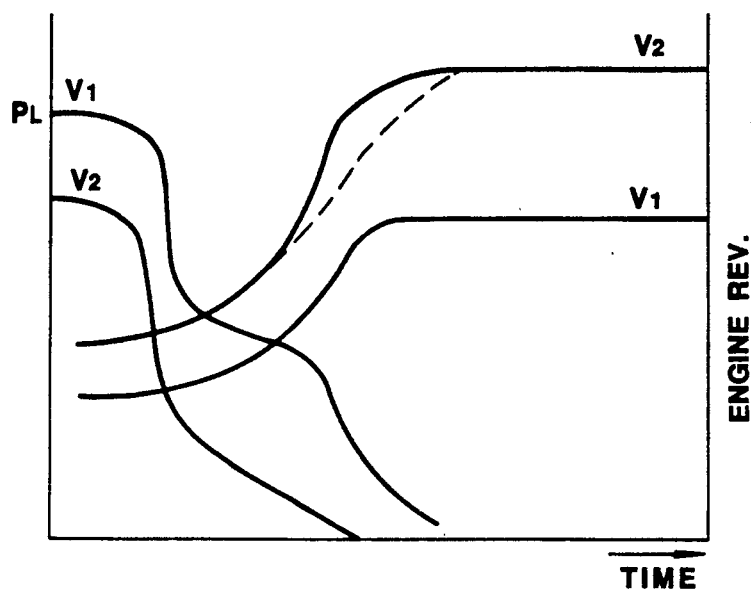
FIG. 8 is a timing diagram illustrating characteristics during a power-on 3-2 downshift at different vehicle speeds ($V_1$ and $V_2$)

FIG. 8 shows how the servo activating hydraulic fluid pressure and the engine revolution speed vary during the power-on 3-2 downshift at a low vehicle speed $V_1$, and those during the same power-on downshift at a high vehicle speed $V_2$ ($V_1<V_2$). It will be noted from FIG. 8 that the hydraulic fluid pressure upon occurrence of a command for the power-on downshift drops as the vehicle speed increases. It will also be noted that the engine revolution speed after the completion of the downshift increases as the vehicle speed increases. In FIG. 8, the broken curve shows how the engine revolution speed increases during the power-on downshift at the vehicle speed $V_2$ if the servo activating hydraulic fluid pressure is not decreased. From FIG. 8, it is seen that during the power-on downshift at high vehicle speed $V_2$, the duration of time required for the engine revolution speed to reach the engine revolution speed value upon completion of the downshift is considerably shortened.

From the preceding description, it will now be appreciated that during a downshift involving discharging hydraulic fluid from a hydraulic fluid operated frictional device to release same, the hydraulic servo activating fluid pressure within the fluid operated frictional device is corrected in response to vehicle speed upon occurrence of a command for the downshift such that the servo activating hydraulic fluid pressure decreases as the vehicle speed increases. As a result, during downshift at high vehicle speed where a difference in engine revolution speed before and after the downshift becomes large, a so-called residual pressure within the hydraulic fluid operated frictional device to be released is decreased, causing an improved rise in engine revolution speed and elimination of or at least reduction of shift lag.

Since the amount of correction decreases as vehicle speed decreases, there is no possibility of inducing undesired engine racing during the downshift at a low vehicle speed.

What is claimed is:

1. In a motor vehicle having an engine and an automatic transmission drivingly connected to the engine, the automatic transmission effecting a downshift from a current gear ratio to a new gear ratio by discharging hydraulic fluid from a predetermined fluid operated frictional device associated with the current gear ratio to release the predetermined fluid operated frictional device after a command for the downshift has occurred;

means for generating a servo activating hydraulic fluid pressure, said servo activating hydraulic fluid pressure being supplied to the predetermined fluid operated frictional device when the current gear ratio is established;

means for detecting a vehicle speed of the motor vehicle and generating a vehicle speed indicative signal indicative of said vehicle speed detected;

means for temporarily varying magnitude of said servo activating hydraulic fluid pressure in response to said vehicle speed indicative signal when the automatic transmission effects the downshift.

2. In a motor vehicle having an engine and an automatic transmission drivingly connected to the engine, the engine having a throttle which opens in degrees, the automatic transmission effecting a downshift from a current gear ratio to a new gear ratio by discharging hydraulic fluid from a predetermined fluid operated frictional device associated with the current gear ratio to release the predetermined fluid operated frictional device after a command for the downshift has occurred;

means for detecting a throttle opening degree of the throttle of the engine and generating a throttle opening degree indicative signal indicative of the throttle opening degree detected;

means for generating a servo activating hydraulic fluid pressure which varies in response to said throttle opening degree indicative signal such that magnitude of said servo activating hydraulic fluid pressure increases as the throttle opening degree increases, said servo activating hydraulic fluid pressure being supplied to the predetermined fluid operated frictional device when the current gear ratio is established;

means for detecting a vehicle speed of the motor vehicle and generating a vehicle speed indicative signal indicative of said vehicle speed detected;

means for urging said servo activating hydraulic fluid pressure generating means to temporarily vary the magnitude of said servo activating hydraulic fluid pressure in response to said vehicle speed indicative signal when the automatic transmission effects the downshift such that said servo activating hydraulic fluid pressure decreases as said vehicle speed increases.

3. A downshift control method in a motor vehicle having an engine and an automatic transmission drivingly connected to the engine, the automatic transmission effecting a downshift from a current gear ratio to a new gear ratio by discharging hydraulic fluid from a predetermined fluid operated frictional device associated with the current gear ratio to release the predetermined fluid operated frictional device after a command for the downshift has occurred, the downshift control method comprising the steps of;

generating a servo activating hydraulic fluid pressure, said servo activating hydraulic fluid pressure being supplied to the predetermined fluid operated frictional device when the current gear ratio is established;

detecting a vehicle speed of the motor vehicle and generating a vehicle speed indicative signal indicative of said vehicle speed detected; and temporarily varying magnitude of said servo activating hydraulic fluid pressure in response to said vehicle speed indicative signal when the automatic transmission effects the downshift.

4. A downshift control method in a motor vehicle having an engine and an automatic transmission drivingly connected to the engine, the engine having a throttle which opens in degrees, the automatic transmission effecting a downshift from a current gear ratio to a new gear ratio by discharging hydraulic fluid from a predetermined fluid operated frictional device associated with the current gear ratio to release the predetermined fluid operated frictional device after a command for the downshift has occurred, the downshift control method comprising the steps of:

detecting a throttle opening degree of the throttle of the engine and generating a throttle opening degree indicative signal indicative of the throttle opening degree detected;

generating a servo activating hydraulic fluid pressure which varies in response to said throttle opening degree indicative signal such that magnitude of said servo activating hydraulic fluid pressure increases as the throttle opening degree increases, said servo activating hydraulic fluid pressure being supplied to the predetermined fluid operated frictional device when the current gear ratio is established;

detecting a vehicle speed of the motor vehicle and generating a vehicle speed indicative signal indicative of said vehicle speed detected; and temporarily varying the magnitude of said servo activating hydraulic fluid pressure in response to said vehicle speed indicative signal when the automatic transmission effects the downshift such that said servo activating hydraulic fluid pressure decreases as said vehicle speed increases.

* * * * *